(12) United States Patent
Toussaint et al.

(10) Patent No.: US 8,185,916 B2
(45) Date of Patent: May 22, 2012

(54) SYSTEM AND METHOD FOR INTEGRATING A BUSINESS PROCESS MANAGEMENT SYSTEM WITH AN ENTERPRISE SERVICE BUS

(75) Inventors: Alexandre Toussaint, San Antonio, TX (US); Eduardo Carlos Rubio, Buenos Aires (AR); Paulo Gustavo Veiga, Buenos Aires (AR); Ignacio Gabriel Rodriguez, Buenos Aires (AR)

(73) Assignee: Oracle International Corporation, Redwood Shores, CA (US)

( * ) Notice: Subject to any disclaimer, the term of this patent is extended or adjusted under 35 U.S.C. 154(b) by 1170 days.

(21) Appl. No.: 11/935,964

(22) Filed: Nov. 6, 2007

(65) Prior Publication Data

US 2009/0006167 A1 Jan. 1, 2009

Related U.S. Application Data

(60) Provisional application No. 60/946,929, filed on Jun. 28, 2007.

(51) Int. Cl.
 *G06F 3/00* (2006.01)
(52) U.S. Cl. ........................................ 719/328; 719/330
(58) Field of Classification Search .................. 719/328, 719/330
 See application file for complete search history.

(56) References Cited

U.S. PATENT DOCUMENTS

| | | |
|---|---|---|
| 3,790,939 A | 2/1974 | Constant |
| 4,604,686 A | 8/1986 | Reiter et al. |
| 4,975,914 A | 12/1990 | Ashton |
| 5,109,515 A | 4/1992 | Laggis |
| 5,182,793 A | 1/1993 | Alexander et al. |
| 5,224,098 A | 6/1993 | Bird |
| 5,249,293 A | 9/1993 | Schreiber et al. |
| 5,265,250 A | 11/1993 | Andrade et al. |
| 5,280,610 A | 1/1994 | Travis et al. |
| 5,329,619 A | 7/1994 | Page et al. |

(Continued)

FOREIGN PATENT DOCUMENTS

WO 9105417 4/1991

OTHER PUBLICATIONS

Wilhelm Hasselbring, The Dublo Architecture Pattern for Smooth Migration of Business Information Systems: An Experience Report, 2004.*

(Continued)

*Primary Examiner* — Lechi Truong
(74) *Attorney, Agent, or Firm* — Fliesler Meyer LLP

(57) ABSTRACT

A system and method are described for integrating a business process management (BPM) system with an enterprise service bus. The BPM system is used to model business processes which contain a set of activities linked by transitions. The BPM system is used to define, publish, deploy and execute the processes in a distributed computing environment. The service bus is used to manage web services and perform routing and transformation of messages between the web services. A transport is used to describe each process defined by the BPM system as a web service on the service bus and provide the ability to connect the BPM component to the enterprise service bus. This allows each of the processes to be exposed as a web service by injecting data retrieved from the process definition into the enterprise service bus. Furthermore, the processes defined in BPM can consume web services from the service bus.

19 Claims, 7 Drawing Sheets

U.S. PATENT DOCUMENTS

| | | | |
|---|---|---|---|
| 5,513,339 | A | 4/1996 | Agrawal et al. |
| 5,546,549 | A | 8/1996 | Barrett et al. |
| 5,628,016 | A | 5/1997 | Kukol |
| 5,701,305 | A | 12/1997 | Albrecht |
| 5,734,837 | A | 3/1998 | Flores et al. |
| 5,784,613 | A | 7/1998 | Tamirisa |
| 5,805,914 | A | 9/1998 | Wise et al. |
| 5,828,832 | A | 10/1998 | Holden et al. |
| 5,835,087 | A | 11/1998 | Herz et al. |
| 5,931,917 | A | 8/1999 | Nguyen et al. |
| 5,974,568 | A | 10/1999 | McQueen |
| 6,018,805 | A | 1/2000 | Ma et al. |
| 6,029,195 | A | 2/2000 | Herz |
| 6,058,391 | A | 5/2000 | Gardner |
| 6,065,055 | A | 5/2000 | Hughes et al. |
| 6,134,680 | A | 10/2000 | Yeomans |
| 6,195,676 | B1 | 2/2001 | Spix et al. |
| 6,209,018 | B1 | 3/2001 | Ben-Shachar et al. |
| 6,212,640 | B1 | 4/2001 | Abdeinur et al. |
| 6,226,677 | B1 | 5/2001 | Slemmer |
| 6,226,752 | B1 | 5/2001 | Gupta et al. |
| 6,314,512 | B1 | 11/2001 | Branson et al. |
| 6,374,144 | B1 | 4/2002 | Viviani et al. |
| 6,415,246 | B1 | 7/2002 | Snyder |
| 6,434,740 | B1 | 8/2002 | Monday et al. |
| 6,516,411 | B2 | 2/2003 | Smith |
| 6,542,841 | B1 | 4/2003 | Snyder |
| 6,542,908 | B1 | 4/2003 | Ims |
| 6,553,563 | B2 | 4/2003 | Ambrose et al. |
| 6,601,234 | B1 | 7/2003 | Bowman-Amuah |
| 6,604,140 | B1 | 8/2003 | Beck et al. |
| 6,615,216 | B1 | 9/2003 | Hu |
| 6,618,737 | B2 | 9/2003 | Aridor et al. |
| 6,618,817 | B1 | 9/2003 | Armstrong |
| 6,622,260 | B1 | 9/2003 | Marisetty et al. |
| 6,631,362 | B1 | 10/2003 | Ullman et al. |
| 6,631,519 | B1 | 10/2003 | Nicholson et al. |
| 6,643,652 | B2 | 11/2003 | Helgeson et al. |
| 6,665,262 | B1 | 12/2003 | Lindskog et al. |
| 6,671,728 | B1 | 12/2003 | Mayberry |
| 6,681,220 | B1 | 1/2004 | Kaplan et al. |
| 6,684,387 | B1 | 1/2004 | Acker et al. |
| 6,718,376 | B1 | 4/2004 | Chu et al. |
| 6,721,779 | B1 | 4/2004 | Maffeis |
| 6,754,659 | B2 | 6/2004 | Sarkar et al. |
| 6,801,916 | B2 | 10/2004 | Roberge et al. |
| 6,826,568 | B2 | 11/2004 | Bernstein et al. |
| 6,836,889 | B1 | 12/2004 | Chan et al. |
| 6,868,441 | B2 | 3/2005 | Greene et al. |
| 6,918,058 | B2 | 7/2005 | Miura et al. |
| 6,918,059 | B1 | 7/2005 | Galuten et al. |
| 6,944,623 | B2 | 9/2005 | Kim |
| 6,947,984 | B2 | 9/2005 | Schweitzer et al. |
| 6,950,845 | B2 | 9/2005 | Givoly |
| 6,954,220 | B1 | 10/2005 | Bowman-Amuah |
| 6,959,307 | B2 | 10/2005 | Apte |
| 6,973,460 | B1 | 12/2005 | Mitra |
| 6,993,683 | B2 | 1/2006 | Bhat et al. |
| 7,017,175 | B2 | 3/2006 | Alao et al. |
| 7,035,202 | B2 | 4/2006 | Callon |
| 7,062,749 | B2 | 6/2006 | Cyr et al. |
| 7,076,508 | B2 | 7/2006 | Bourbonnais et al. |
| 7,086,066 | B2 | 8/2006 | Kappel et al. |
| 7,092,928 | B1 | 8/2006 | Elad et al. |
| 7,117,504 | B2 | 10/2006 | Smith et al. |
| 7,146,544 | B2 | 12/2006 | Hsu et al. |
| 7,149,734 | B2 | 12/2006 | Carlson et al. |
| 7,155,447 | B2 | 12/2006 | Roberge et al. |
| 7,162,721 | B2 | 1/2007 | Ali et al. |
| 7,165,097 | B1 | 1/2007 | Mackin et al. |
| 7,168,014 | B2 | 1/2007 | Ghosh et al. |
| 7,171,672 | B2 | 1/2007 | Just |
| 7,180,866 | B1 | 2/2007 | Chartre et al. |
| 7,181,684 | B2 | 2/2007 | Chittu et al. |
| 7,185,060 | B2 | 2/2007 | Christensen et al. |
| 7,191,381 | B2 | 3/2007 | Gesbert et al. |
| 7,206,974 | B2 | 4/2007 | Kozlov et al. |
| 7,236,546 | B2 | 6/2007 | Egnor et al. |
| 7,242,925 | B2 | 7/2007 | O'Neil et al. |
| 7,243,267 | B2 | 7/2007 | Klemm et al. |
| 7,289,964 | B1 | 10/2007 | Bowman-Amuah |
| 7,373,563 | B2 | 5/2008 | Noy et al. |
| 7,376,959 | B2 * | 5/2008 | Warshavsky et al. ......... 719/330 |
| 7,380,166 | B2 | 5/2008 | Thatte et al. |
| 7,406,030 | B1 | 7/2008 | Rijsman |
| 7,502,716 | B2 * | 3/2009 | Bourne et al. ................ 702/183 |
| 7,562,339 | B2 * | 7/2009 | Racca et al. ................. 717/102 |
| 7,603,674 | B2 | 10/2009 | Cyr et al. |
| 7,624,404 | B2 * | 11/2009 | Yagi .............................. 719/330 |
| 7,706,964 | B2 | 4/2010 | Horvitz et al. |
| 7,797,450 | B2 * | 9/2010 | Xie et al. ...................... 709/246 |
| 2001/0007984 | A1 | 7/2001 | Fattah et al. |
| 2001/0010053 | A1 | 7/2001 | Ben-Shachar et al. |
| 2001/0051949 | A1 | 12/2001 | Carey et al. |
| 2002/0059345 | A1 | 5/2002 | Wang et al. |
| 2002/0099818 | A1 | 7/2002 | Russell et al. |
| 2002/0120711 | A1 | 8/2002 | Bantz et al. |
| 2002/0152254 | A1 | 10/2002 | Teng |
| 2002/0160745 | A1 | 10/2002 | Wang |
| 2002/0186128 | A1 | 12/2002 | Amano et al. |
| 2002/0188616 | A1 | 12/2002 | Chinnici et al. |
| 2003/0018732 | A1 | 1/2003 | Jacobs et al. |
| 2003/0025599 | A1 | 2/2003 | Monroe |
| 2003/0033346 | A1 | 2/2003 | Carlson et al. |
| 2003/0033351 | A1 | 2/2003 | Ricciardi |
| 2003/0051190 | A1 | 3/2003 | Marisetty et al. |
| 2003/0065726 | A1 | 4/2003 | Wells et al. |
| 2003/0093479 | A1 | 5/2003 | Mellen-Garnett et al. |
| 2003/0105800 | A1 | 6/2003 | Cullen |
| 2003/0135556 | A1 | 7/2003 | Holdsworth |
| 2003/0142680 | A1 | 7/2003 | Oguchi |
| 2003/0149934 | A1 | 8/2003 | Worden |
| 2003/0154265 | A1 * | 8/2003 | Raffaele et al. ................ 709/221 |
| 2003/0163646 | A1 | 8/2003 | O'Neil |
| 2003/0167296 | A1 | 9/2003 | Todd |
| 2003/0172145 | A1 | 9/2003 | Nguyen |
| 2003/0172368 | A1 | 9/2003 | Alumbaugh et al. |
| 2003/0191679 | A1 | 10/2003 | Casati et al. |
| 2003/0195997 | A1 | 10/2003 | Ibert et al. |
| 2003/0212987 | A1 | 11/2003 | Demuth et al. |
| 2003/0236689 | A1 | 12/2003 | Casati et al. |
| 2004/0001514 | A1 | 1/2004 | Wookey et al. |
| 2004/0002838 | A1 | 1/2004 | Oliver et al. |
| 2004/0019465 | A1 | 1/2004 | Kerr et al. |
| 2004/0019835 | A1 | 1/2004 | Marisetty et al. |
| 2004/0073782 | A1 | 4/2004 | Price et al. |
| 2004/0081178 | A1 | 4/2004 | Fujimori |
| 2004/0093381 | A1 | 5/2004 | Hodges et al. |
| 2004/0095833 | A1 | 5/2004 | Marisetty et al. |
| 2004/0098484 | A1 | 5/2004 | Wuebker |
| 2004/0117435 | A1 | 6/2004 | Rossmanith et al. |
| 2004/0143625 | A1 | 7/2004 | Sheinis et al. |
| 2004/0163088 | A1 | 8/2004 | Frender et al. |
| 2004/0168184 | A1 | 8/2004 | Steenkamp et al. |
| 2004/0181543 | A1 | 9/2004 | Wu et al. |
| 2004/0225670 | A1 | 11/2004 | Cameron et al. |
| 2005/0015462 | A1 | 1/2005 | Lee et al. |
| 2005/0015773 | A1 | 1/2005 | Gorman et al. |
| 2005/0021348 | A1 | 1/2005 | Chan et al. |
| 2005/0021751 | A1 | 1/2005 | Block et al. |
| 2005/0021772 | A1 | 1/2005 | Shedrinsky |
| 2005/0080930 | A1 | 4/2005 | Joseph |
| 2005/0108246 | A1 | 5/2005 | Dillon |
| 2005/0120106 | A1 | 6/2005 | Albertao |
| 2005/0149517 | A1 | 7/2005 | Cosic |
| 2005/0160434 | A1 | 7/2005 | Tan et al. |
| 2005/0182787 | A1 | 8/2005 | Oswait |
| 2005/0188079 | A1 | 8/2005 | Motsinger et al. |
| 2005/0204214 | A1 | 9/2005 | Welch |
| 2005/0234969 | A1 | 10/2005 | Mamou et al. |
| 2005/0240621 | A1 | 10/2005 | Robertson et al. |
| 2005/0278335 | A1 | 12/2005 | Patrick et al. |
| 2006/0064483 | A1 * | 3/2006 | Patel ............................ 709/224 |
| 2006/0069717 | A1 | 3/2006 | Mamou et al. |
| 2006/0095815 | A1 | 5/2006 | Noy et al. |
| 2006/0150156 | A1 | 7/2006 | Cyr et al. |

| | | |
|---|---|---|
| 2007/0106761 A1 | 5/2007 | Beoughter et al. |
| 2007/0226682 A1 | 9/2007 | Kilgore et al. |
| 2008/0235934 A1 | 10/2008 | Burnett et al. |

OTHER PUBLICATIONS

Mangtani, Nitin, et al., "Liquid Data: XQuery-Based Enterprise Information Integration," downloaded from dev2dev.bea.com/lpt/a/186 on May 16, 2005, 9 pages (Nov. 18, 2004).

Krill, Paul, "ComputerWorld—Driving the Enterprise Service Bus," InfoWorld, 5 pages (Jun. 16, 2003).

BeaLiquid Data for WebLogic™, Concepts Guide, Version 8.1; Document Date: Jul. 2003; Revised: Dec. 2003; Part No. 886-002005-003.

The Most Cost Effective Solution for Data Integration: Application Router™ 1000, Cast Iron Systems—Rethink Integration; 2005 Cast Iron Systems, 7 pages; (last printed: May 31, 2005) castironsys.com/products.shtml.

Cast Iron Systems Platform, Version 2.3—Mar. 2004—Product Overview, 5 pages. 2004, Cast Iron Systems. castironsys.com.

Cast Iron Application Router™ 1000—Technical Brochure, 8 pages; 2004 Cast Iron Systems castironsys.com.

EntireX, XML-Powered Integration—White Paper; Software AG, The XML Company, 19 pages; Sep. 2002 softwareag.com.

Blue Titan Network Director, Blue Titan Software, 4 pages, 2003 Blue Titan, Inc. bluetitan.com.

Rethink Integration™ 2004 Cast Iron Systems. castironsys.com.

Sonic ESB Datasheet, 4 pages, 2004 Sonic Software Corporation, sonicsoftware.com.

Best-of-Breed ESBs, Identifying Best-of-Breed Characteristics in Enterprise Services Buses (ESBs), Jun. 2003, A White Paper from Steve Craggs, Vice-Chairman, EAI Industry Consortium, Sponsored by Sonic Software, 2003 Saint Consulting Limited.

International Search Report for PCT/US05/18183 dated Dec. 2, 2005, 2 pages.

Australian Patent Office Search Report for SG200600938-5, dated Oct. 4, 2007, 7 pages.

"<rethrow>", cafe.bevocal.com definition, retrieved from <http://www.archive.org/web/20030405195631/cafe.bevocal.com/docs/vxml/rethrow.html>, Apr. 5, 2003, 2 pages.

Andera, "When is a Throw not a Rethrow?", Craig Andera's Weblog, <http://www.pluralsight.com/blogs/craig/archive/2003/08/04/900.aspx>, Aug. 4, 2003, 7 pages.

U.S. Appl. No. 10/050,319, filed Jan. 15, 2002, entitled "Introspection Module for Business Process Development and Execution," 75 pages.

U.S. Appl. No. 10/050,577, filed Jan. 15, 2002, entitled "A Debugger for Business Process Development and Execution," 74 pages.

U.S. Appl. No. 10/050,374, filed Jan. 15, 2002, entitled "Analytical Data Browser for Business Process Development and Execution," 75 pages.

International Search Report and Written Opinion for PCT/US08/63983 dated Aug. 1, 2008, 7 pages.

* cited by examiner

SYSTEM AND METHOD FOR INTEGRATING A BUSINESS PROCESS MANAGEMENT SYSTEM WITH AN ENTERPRISE SERVICE BUS

CLAIM OF PRIORITY

The present application claims the benefit of U.S. Provisional Patent Application No. 60/946,929, entitled SYSTEM AND METHOD FOR INTEGRATING A BUSINESS PROCESS MANAGEMENT SYSTEM WITH AN ENTERPRISE SERVICE BUS, by Alexandre Toussaint et al., filed on Jun. 28, 2007, which is incorporated herein by reference in its entirety.

CROSS REFERENCE TO RELATED APPLICATIONS

The following commonly owned, co-pending United States Patent Applications are related to the present Application and are incorporated by reference herein in their entirety:

U.S. Provisional Patent Application No. 60/938,976 entitled SYSTEM AND METHOD FOR ENABLING DECISION ACTIVITIES IN A PROCESS MANAGEMENT AND DESIGN ENVIRONMENT, by Eduardo Carlos Rubio, et al., filed on May 18, 2007;

U.S. patent application Ser. No. 11/937,390 entitled SYSTEM AND METHOD FOR ENABLING DECISION ACTIVITIES IN A PROCESS MANAGEMENT AND DESIGN ENVIRONMENT, by Juan Cruz Nores, et al., filed on Nov. 8, 2007;

U.S. patent application Ser. No. 11/131,839, entitled SERVICE PROXY DEFINITION, by Paul B. Patrick, et al., filed on May 18, 2005.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsover.

FIELD OF THE INVENTION

The current invention relates generally to web services and business process modeling software, and more particularly to integrating a business process management system with an enterprise service bus.

BACKGROUND

In recent years, web services and business process management (BPM) systems have become more and more widely used among various organizations. A business enterprise typically desires to integrate all of its data and processes into a single and unified system. For example, an organization may automate a business process by having a computer perform certain activities of the business, such as receiving a sales order, sending a notification to a client, or reminding a human participant of work that needs to be performed.

While automation of such business processes has posed a number of difficulties, software has become an increasingly important solution component of BPM. By implementing software BPM suites, enterprises are becoming more and more able to increase productivity, performance, profits and decrease inefficiency due to various factors.

Nevertheless, a multitude of inefficiencies and problems remain in the BPM software world. The ability of such systems to efficiently integrate into other existing systems, to monitor, improve and expose business processes, and to generally enable efficient service oriented architecture (SOA) deployments can be improved and these improvements can have significant advantages in business productivity.

In many large project instances, organizations implement an enterprise service bus (ESB) in order to accelerate deployment of service-oriented architecture (SOA) through scalable and extensible integration of service infrastructure. For example, the AquaLogic® Service Bus available from BEA Systems, Inc., can connect, mediate and manage services dynamically and provide an enterprise-ready service intermediary that protects against costs and disruptions of ongoing service changes. In general, such enterprise service buses have been deployed, managed and maintained separately from the business process modeling systems described above, much to the detriment of various persons and organizations trying to maintain efficiency and reliability of such systems.

In light of the foregoing, a system is desirable, which is able to integrate the various web service management systems (such as the service bus) with the business process modeling (BPM) system in order to increase efficiency, synchronize various components and enable bidirectional communications between the two systems. Applicants have identified these as well as other needs, which currently exist in the art, in coming to conceive the subject matter of the present disclosure.

DETAILED DESCRIPTION

Figure 1:
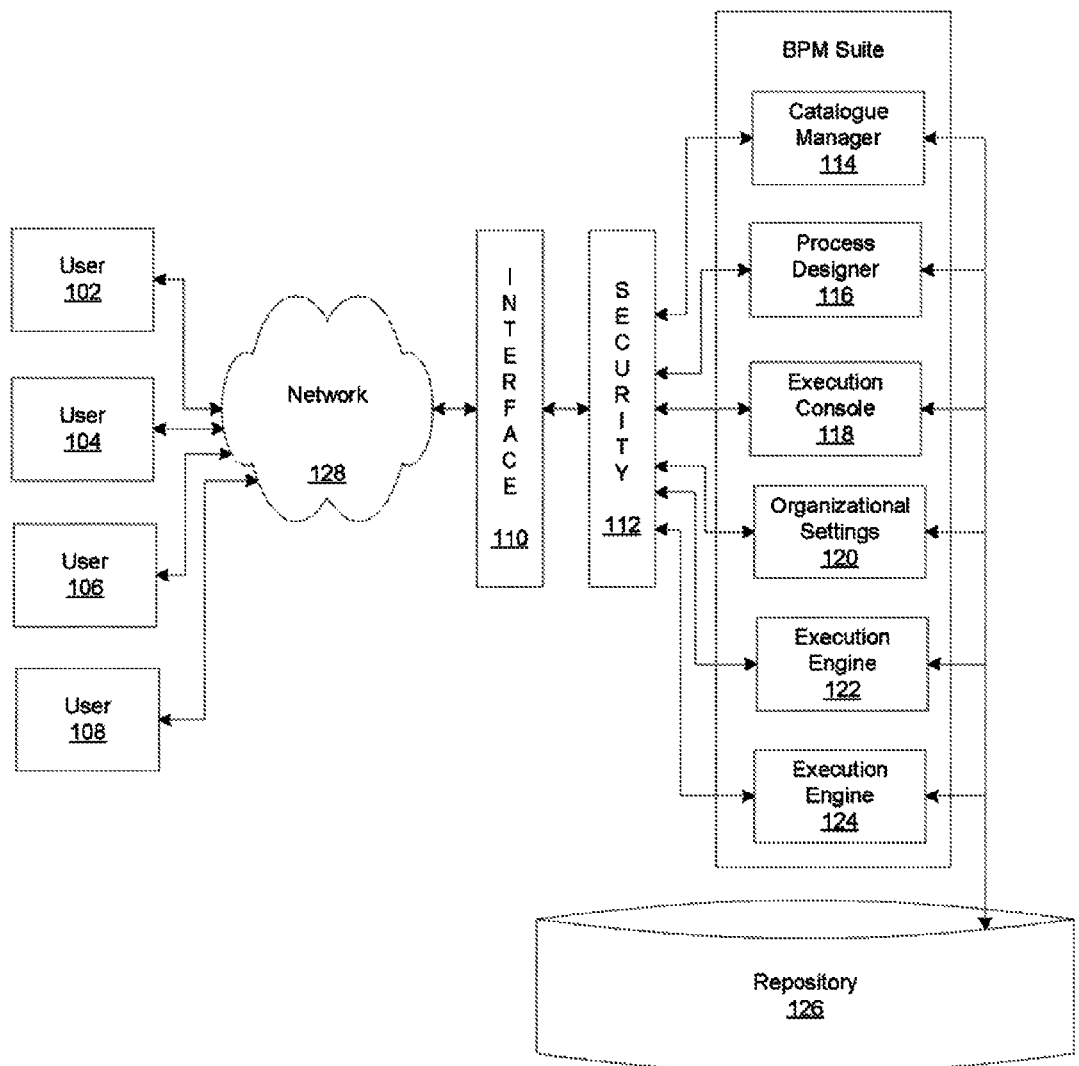
FIG. 1 is an illustration of an exemplary business process management system, in accordance with various embodiments.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device or appliance. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided systems and methods for integrating a business process management (BPM) system with an enterprise service bus (ESB). This integration can provide the advantages, including but not limited to (1) an ability to abstract and de-couple service calls from the BPM system, (2) the ability to leverage all of the services provided by the service bus, such as monitoring, reporting, transformations, routing of service calls, service level agreements (SLAs) and (3) an extension of the reach of the BPM system by leveraging all of the communication protocols available with the enterprise service bus.

In one embodiment, a system is described that includes a business process management system used to model and define business processes comprised of a set of activities linked by transitions. The BPM system is used to create a definition of the process and to publish and deploy the process in a distributed computing environment. The system further comprises an enterprise service bus, that is used to manage web services, perform routing and transformation of messages between the web services and provide various other types of functionality, as will be described in further detail below. A transport can be created to describe each business process defined by the BPM system, as a web service on the service bus. This transport can provide the ability to connect the business process management component to the enterprise service bus, such that each of the processes is exposed as a web service residing on the ESB. In one embodiment, this can be accomplished by injecting data retrieved from the process definition into the enterprise service bus.

The connectivity between the enterprise service bus and the BPM system enables bi-directional interaction between the two platforms. For example, each business process generated and deployed on the BPM system can be made available as a web service residing on the ESB. This allows the BPM process to take advantage of the management, reporting, monitoring and various other functionality that is provided by the ESB. Similarly, web services managed by the service bus can be invoked from within the BPM process, such as within a particular activity of the process definition, thereby giving the BPM system an ability to leverage various communication protocols and other features available from the service bus.

In various embodiments, the interaction between the BPM system and the service bus is authenticated. In one embodiment, the BPM component acts as a consumer of services. In this case, the ESB services are introspected and invoked from the BPM processes. The BPM system can consume services using both hypertext transfer protocol (HTTP) transport and a specific optimized transport generated to carry data between the BPM and the ESB. In the embodiment where the BPM system is acting as a consumer, the authentication is performed by the BPM system introspecting a username token WS-Security Policy assertions attached to the business service web services description language (WSDL) document. The WSDL of the proxy service exposed as a web service can be found using a uniform resource locator (URL). If the BPM system is acting as a provider, the BPM processes exposed as a web service can be made to support the username token profile.

In various embodiments, the proxy service introspection of the ESB can be simplified in order to create a better user experience for the BPM system. First, a proxy service can be selected on the enterprise service bus and the ESB management host external resource can be selected or created for the proxy. The appropriate transport can be determined and a representation of the selected proxy service is generated in the catalog of the BPM system. Further, a new ESB proxy service external resource can be automatically created.

The BPM processes that are being exposed as web services can be published and deployed on the service bus. This can be performed via a process administration console. For example, on the edit external resource screen of the console, the user can specify the name of the project and the folders path which may exist, otherwise the corresponding paths may need to be created. Via this screen, the user can publish the selected process on the service bus, update processes that are out of date or incompatible or un-publish selected processes.

In various embodiments, the possible states of the published process include, but are not limited to the following:
 a. Up to date—the process in the service bus matches the most recent version of the process in the BPM system;
 b. Out of date—the process in the service bus is out of date, but the newest version is compatible with the old one, so it can be updated without any issues;
 c. Incompatible—the process in the service bus is out of date and the newest version is incompatible with the old one. A confirmation dialog can be shown in this case and if accepted, the new version will be published with its version number appended at the end of its name. In one embodiment, it can be user's responsibility to remap or rename the services using the old version to the new one.
 d. Invalid—a BPM process was found on that project and folders of the service bus, but that process does not match any process exposed as process web services on this BPM project.

In various embodiments, a management application programming interface (API) can be provided for both listing of service bus objects and creating and moving or publishing of these objects. In one embodiment, the API connects to the enterprise service bus via Java Management Extensions (JMX) and uses the public service bus MBeans to perform the required operations. For example, the service bus configuration MBean can be used. The BPM system can wrap all the operations on a data access object (DAO) manager class such as "fuego.alsb.dao.DAOManager." Of course, the naming convention is not limiting and is provided for illustration purposes only.

A set of service queries can be provided for retrieving proxy services and business services using parameters such as query.setWSDLBasedService(true) or query.setTransportScheme("http"). The version of the BPM process can be stored on the web services description language (WSDL) document representing that process on the service bus.

In various embodiments, in order to publish a new BPM process on the service bus, a set of objects can be exported from the ESB as a template and they can be further customized. Subsequently, these customized objects can be packaged inside a Java Archive (JAR) file and uploaded and imported into the enterprise service bus using JMX. In one embodiment, during the process, the customized templates are stored on the local computer's temp directory and these filed need not necessarily be deleted after the import is completed.

BPM System

The term business process management (BPM), as it is generally used, defines the different activities of an organization or a business group used to implement and complete specific processes. After a process is in place, additional steps can be performed to improve and optimize its flow and performance. In broad terms, the main activities that constitute business process management can be divided into four top categories: design, implementation, execution, and monitoring. A business process management system can provide a collection of software tools that together can be used to model, implement, run, monitor, and optimize a business process.

Business processes are a part of the day-to-day operations and services of any corporation. Some examples of processes include applying for a house loan (e.g. loan origination process), starting a mobile phone service (account initiation process), hiring a new employee (employee on-boarding process), building a new jet engine (parts and assembly process) as well as countless other processes performed by enterprises and organizations in order to accomplish specific goals. Processes can range from very simple to highly complex and sophisticated, involving numerous decisions, tasks and activities.

The term process, as used in this specification, is a set of activities which collectively realize a business objective. The business process can be thought of as the process-driven application, with the model and all the integration, presentation, and logic. A typical process includes a logical flow with associated roles and systems. It is modeled, tested, and simulated within the process designer component of the business process management (BPM) system. Each process can have associated therewith a process definition, which provides the representation of the business process in a form that supports automated manipulation, such as modeling or enactment by a process execution engine or a web service. The process definition contains a set of related activities and their relationships, as well as criteria to indicate the start and termination of the process, and information about the individual activities, such as roles, systems, and user interface forms. In one embodiment, the process definition is contained in an extensible markup language (XML) file and can be read, executed, monitored and manipulated by a process designer, execution engine or other components of the BPM system.

Business process can be designed with a process designer and executed with a BPM execution engine, along with client applications, management tools, and other components, to interact with it. All of these modules can be included within the BPM system. Additionally, if a business process invokes web services, reads from a custom database, or uses Enterprise JavaBeans (EJBs), it may be necessary to ensure that these services are available in order to enable the application to work as expected.

In one embodiment, a process includes a set of activities, where each activity represents a single piece of work that forms a different step of the process. The various steps are linked together through transitions. Activities can be user-interactive or they can be totally automated. An activity can also include a series of tasks to complete that activity. For user-interactive activities, a role can be defined to identify which user is allowed to interact with the process at each point.

When a business process is executed by an engine, it forms a specific process instance. A process instance is the representation of a single enactment of a process, or an activity within a process, including its associated data. In one embodiment, each instance represents a separate thread of execution of the process or activity, and will have its own internal state and externally visible identity, which may be used, for example, to record or retrieve audit data relating to the individual enactment, such as a particular purchase order number, as opposed to the general purchase order process. Instances can start at the Begin activity of the process and finish in the End activity. The path the instances take can depend entirely on the data of the instance and the external environment.

FIG. 1 is an illustration of an exemplary business process management system, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Such components, regardless of how they are combined or divided, can execute on the same computing device or can be distributed among different computing devices connected by one or more networks or other suitable communication means. Furthermore, it will also be apparent to one of ordinary skill in the art that certain components can be added, interchanged or removed from this figure without departing from the scope of the various embodiments.

As illustrated, a business process management system can include a set of software modules that can be accessed via a network 128, such as the internet, by various users 102, 104, 106, 108. The network can also include wired or wireless communications, radio frequency (RF)-based, satellite, microwave or any other form of communication network where exchange of data is enabled between the components connected thereto. In various embodiments, the BPM system includes an interface layer 110, such as a graphical user interface (GUI) accessible via a website or portal, for allowing a user to design, manipulate, execute and monitor the performance of various processes. Furthermore, the system can include a security layer 112 that enables user authentication and authorization of services to the system.

The BPM system can include a catalog manager 114 that is used to define and specify the components or programs that are called from a business process. These BPM components can include compiled software programs, classes or routines that are stored by the catalog manager in a data repository 126. In one embodiment, the catalog manager defines, describes and organizes the software components.

The process designer module 116 can be used to design business processes by various users of the BPM system. Once the process is designed by using the process designer, its definition file can be generated and stored on a local or remote computer. The designer can also publish the created business processes. Once the designed business process is published, it can be stored into the data repository 126 and it can also be deployed to an execution engine 122, 124 for executing.

The execution console 118 can be used by various users of the system in order to manage any of the execution engines 122, 124 which have process instances deployed and executing thereon. In one embodiment, the execution engines are used to deploy the published business processes, execute tasks by the users, and perform automatic business process activities and perform any other tasks needed by each activity of the process instance. The execution engines 122, 124 can manage the execution of each process instance. One example of such process instance is processing a specific sales order using a general business process for processing sales orders. The execution engine can retrieve and collect business process definitions from the repository, manage the execution of a particular user-interactive task or automatically execute the task if it is automated.

A BPM server can maintain the state of each executing process instance in the repository 126. A repository can include a relational database management system (RDBMS), file storage, content management systems as well as any other form of data storage systems. During the execution of the instance, persistent variables can maintain the values for each activity/task of the specific process instance. These variables can be stored in the repository and can be associated with the specific process instance.

In various embodiments, persistent variables can include instance variables and argument variables. Instance variables can record values that may be passed from one activity of a business process to another activity within the same business process. As such, instance variables maintain the state of the instance within the context of the business process. Argument variables, on the other hand record values that may be passed from one business process or instance to another business process or instance.

In various embodiments, the BPM system illustrated in FIG. 1 can have a multitude of different users. As an illustration, user 102 may be a business designer person that uses the BPM system to design the various processes desired by an enterprise. Users 104 and 106 can be employees of the enterprise which are responsible for executing the various activities of the business process instance. For example, user 104 can be a salesperson that receives a sales order, verifies it for completeness and enters it into the system. User 106 may be a supervisor who validates or otherwise resolves any exceptional situations that may occur. User 108 can be an administrator of the BPM system, responsible for monitoring and improving the performance of the business processes executing on the engines.

Each user or sets of users can be assigned to a particular role. In one embodiment, a role is a job function in a process that has associated activities to be performed by a user or group. Users and/or groups can be associated with process roles in the process administrator utility. A business process can include an abstract role that is used at design time to represent abstract user sets which will represent the persons in an organization responsible for performing the various activities of the process. Subsequently, the abstract role can be matched to an organizational role based on values that correspond to the actual users of the organization. As such, the organizational role can be parametric, by being assigned a value that corresponds to user sets and can take on multiple values that correspond to different user sets. The use of abstract roles enables a business process to be designed and deployed to several different organizations, by specifying the organization-specific users via the organizational settings module 120.

Figure 2:
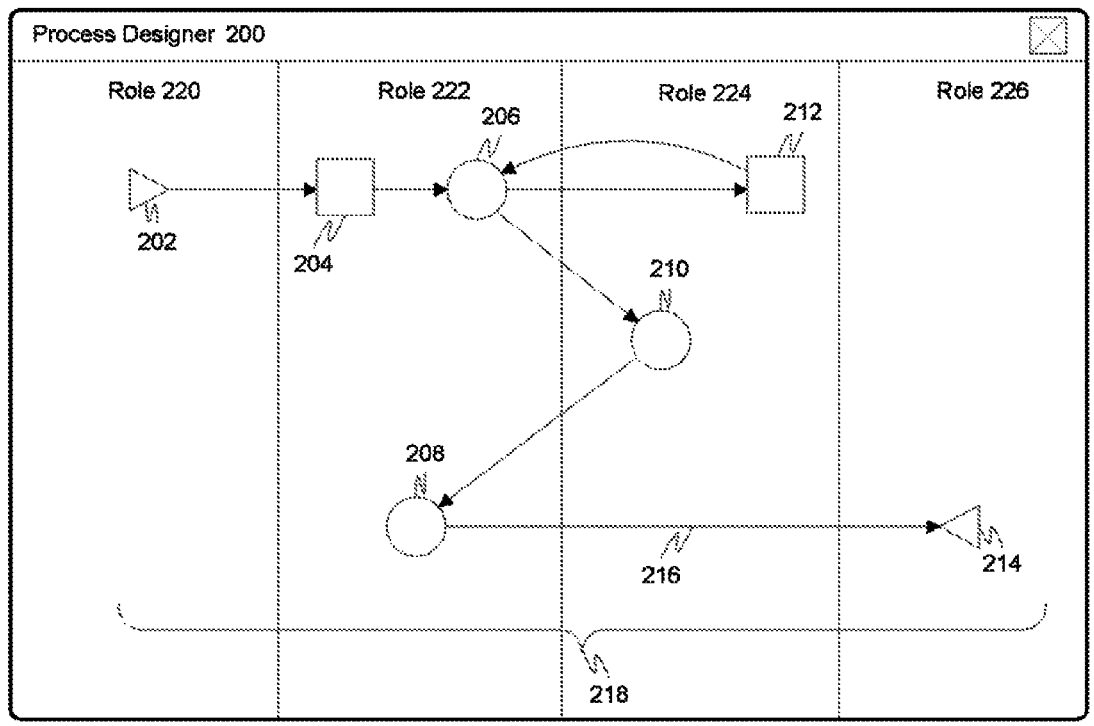
FIG. 2 is an exemplary illustration of an interface screen used to design and manipulate processes of the BPM system, in accordance with various embodiments.

FIG. 2 is an exemplary illustration of an interface screen used to design and manipulate processes of the BPM system, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Such components, regardless of how they are combined or divided, can execute on the same computing device or can be distributed among different computing devices connected by one or more networks or other suitable communication means. Furthermore, it will also be apparent to one of ordinary skill in the art that certain components can be added, interchanged or removed from this figure without departing from the scope of the various embodiments.

As illustrated, a process 218 can be designed and modeled by manipulating various graphical icons of the interface screen 200. Custom colors and shapes can be used to designate the various activities, tasks and transitions of the business process. In one embodiment, a process includes a set of activities connected by one or more transitions 216. The set of activities can include a Begin activity 202 and an End activity 214 used to initiate and finish the execution of the business process. Furthermore, each activity can be fully automated or can require user intervention. In one embodiment, fully automated activities 204, 212 can be illustrated as square-shaped icons, while those activities 206, 208, 210 involving human intervention can be illustrated by circular shaped icons.

The sequence of activities can be coupled by transitions such as transition 216. The transitions can be used to which activity or activities are to be initiated after the completion of the current activity. Either one, multiple or no activities can be invoked after completion of each activity. In one embodiment, the number and invocation of the next activities depends on the data evaluated and decisions made during the current activity.

The business process 218 can be designed by using one or more roles 220, 222, 224, 226. At design time, these roles can be abstract roles so as to enable the use of the process with multiple organizations. At runtime, the abstract roles can be matched to organizational roles, with specific user sets filling each role. In one embodiment, the activity is placed in a particular role column, as illustrated in FIG. 2. The user that satisfies the role can be permitted or required to perform the various tasks of each activity. For example, the users assigned to role 222 can perform the tasks associated with activities 206 and 208 and users assigned to role 224 can perform the tasks associated with activity 210.

As one illustration, the business process 218 can include a sequence of activities for processing a sales order. Each activity could comprise its own series of tasks. For example, an activity that notifies a client of an incomplete sales order may include the task of sending a notification email message. It should be noted that the specific business process shown in FIG. 2 is provided purely for illustrational purposes and is not intended to limit the invention. The BPM system can be used to design, execute and monitor a wide variety of business processes, ranging from very simple to highly sophisticated. Furthermore, it should also be noted that the particular graphical symbols used to illustrate each activity or transition are also provided purely as examples and any alternative symbols could be used within the scope of the various embodiments described herein. In some scenarios, the symbols could also be made configurable by a user or administrator of the system.

Enterprise Service Bus

In many cases, enterprises need to not only create processes and services, but also manage them across the service life cycle-discovery, composition, interoperability, security, validation, deployment, operations, management and administration. The enterprise service bus is therefore designed for connecting, mediating and managing interactions between various heterogeneous services, not only web services, but also Java, .Net, messaging services, and legacy end points. All layers of the architecture can be service-enabled presentation services, business processes, data services and shared services.

Figure 3:
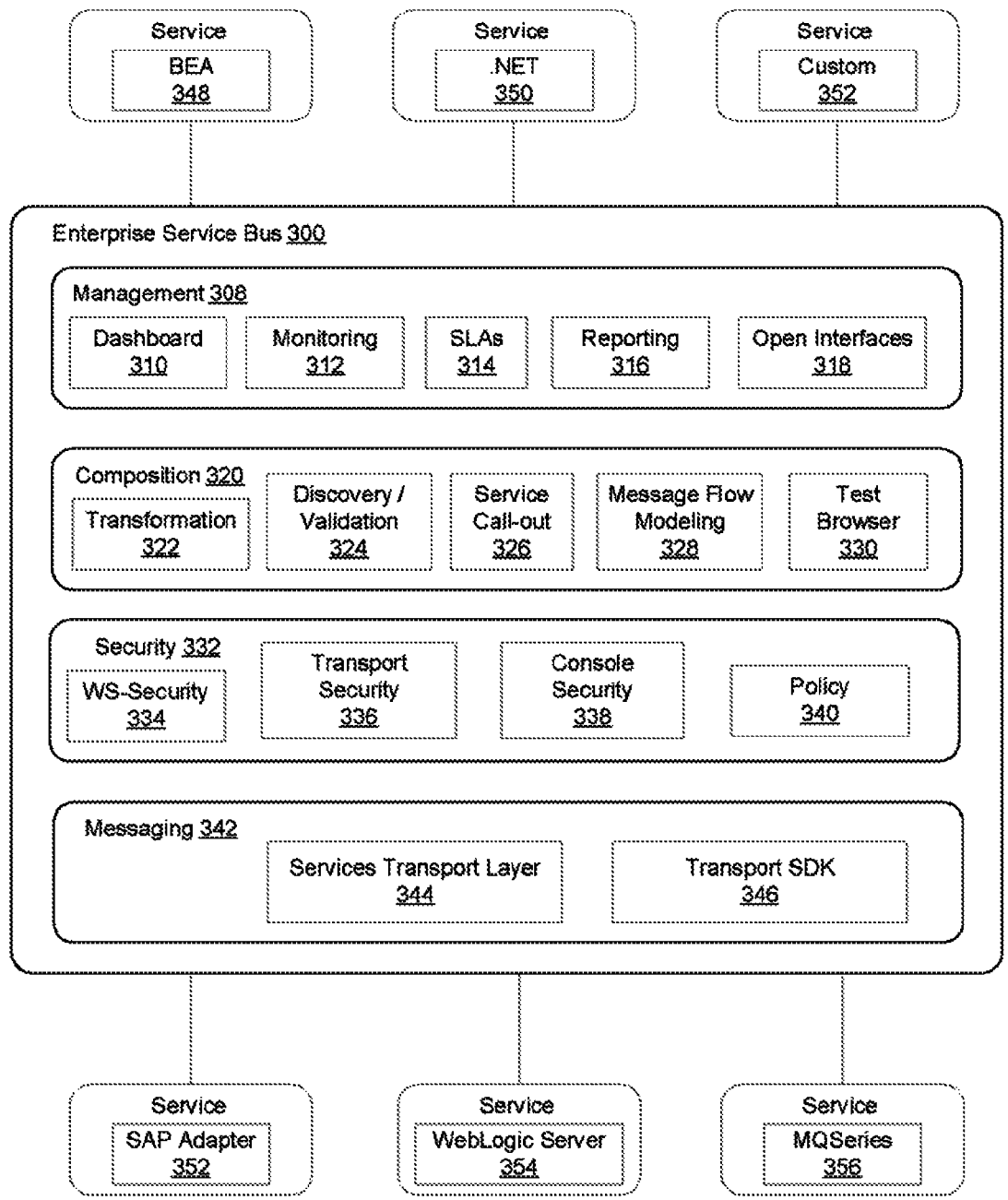
FIG. 3 is an illustration of an enterprise service bus, in accordance with various embodiments.

FIG. 3 is an illustration of an enterprise service bus, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Such components, regardless of how they are combined or divided, can execute on the same computing device or can be distributed among different computing devices connected by one or more networks or other suitable communication means. Furthermore, it will also be apparent to one of ordinary skill in the art that certain components can be added, interchanged or removed from this figure without departing from the scope of the various embodiments.

As illustrated, the enterprise service bus (ESB) can be implemented on an application server and can provide a flexible infrastructure for composing and managing services, able to handle any incompatibilities that may arise between them. The ESB 300 thus provides the functionality of service management 308, composition 320, security 332 and messaging 342. In one embodiment, service management includes dashboard applications 310, monitoring (with metrics collection and display) 312, service level agreements (SLAs) 314, reporting 316 and open interface functionality 318. Composition of services can include transformation of messages 322, service discovery and validation 324, service call-out 326, message flow modeling 328 and a test browser 330. Security can include web services (WS) security 334, such as the OASIS Web Service Security standard, as well as the Username Token Profile and X.509 Token Profile. Furthermore, security can also encompass transport protocol security 336, console security 338 and policy 340. Furthermore, messaging can include a services transport layer 344 and a transport software development kit (SDK).

In various embodiments, the ESB 300 can act as an intermediary between service consumers and service providers. In certain embodiments, some service providers are also service consumers and vice versa. The ESB can connect and mediate a wide variety of services, such SAP Adapter 352, WebLogic® Server 354, MQSeries 356, BEA 348, .NET 350, custom services 352 and various others. In one embodiment, the service bus contains a set of proxy services which serve as intermediaries hosted locally on the ESB. The service clients can thus exchange messages with an intermediary proxy service instead of directly with an external service.

Figure 4:
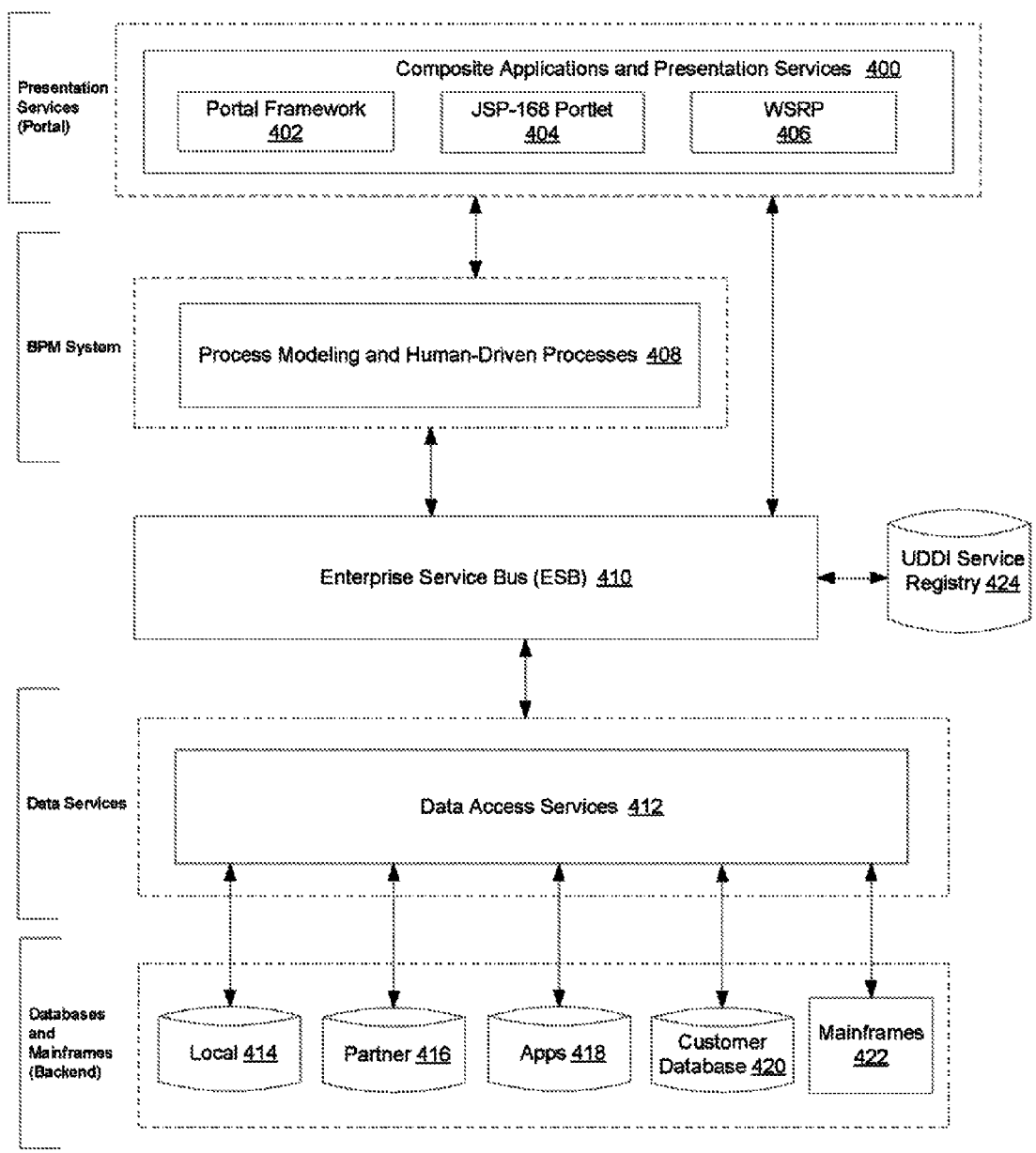
FIG. 4 is an illustration of an exemplary BPM and ESB deployment architecture, in accordance with various embodiments.

FIG. 4 is an illustration of an exemplary BPM and ESB deployment architecture, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Such components, regardless of how they are combined or divided, can execute on the same computing device or can be distributed among different computing devices connected by one or more networks or other suitable communication means. Furthermore, it will also be apparent to one of ordinary skill in the art that certain components can be added, interchanged or removed from this figure without departing from the scope of the various embodiments.

As illustrated, the general architecture includes a presentation services infrastructure that provides composite applications and presentation services 400. This infrastructure can be provided for example by WebLogic® Portal available from BEA Systems Inc. or any other product that offers similar functionality. In various embodiments, the presentation services layer can include a portal framework 402, JSR-168 compliant Portlets 404 and web services for remote portlets (WSRP) 406. JSR-168 is a Java application programming interface (API) designed to enable interoperability between the portal server and various portlets in a standardized manner. WSRP, on the other hand, is a protocol designed to access remote portlets in a standard way. These two specifications are often used together where JSR-168 specifies the portlet and WSRP specifies remote communications of the portlet with remote containers.

The business process management infrastructure can provide the process modeling and human driven processes 408. In various embodiments, this component of the architecture is the BPM system, as described above. The BPM system is a set of design, development, and runtime modules for building business process management solutions. In one embodiment, the modules are used for modeling, simulating, developing, deploying, executing and managing enterprise business processes.

The enterprise service bus 410 can be used to expose and manage the business processes defined by the BPM System. Furthermore, the service bus can be accessed directly from the portal framework or various other components and can manage a wide variety of other services, in addition to the processes of the BPM. In various embodiments, the services managed and exposed via the enterprise service bus can be listed on a universal description, discovery and integration (UDDI) service registry 424. UDDI is an extensible markup language (XML)-based registry that enables various businesses worldwide to publish service listings, discover and define how those services can be accessed and interact with each other over networks, such as the internet. The UDDI registry can be interrogated via the SOAP protocol and can provide access to web services description language (WSDL) documents for the services listed thereon. In various embodiments, the BPM processes exposed on the service bus can also be published to the UDDI registry for access by other entities.

The data layer of the architecture can enable data access services 412 that provide a unified view of data from any source across the enterprise. In one embodiment, the data access services can be provided by the Aqualogic® Data Services Platform, available from BEA Systems Inc. or any other similar product. In various embodiments, the data services layer allows services to function as single access points for unified and consistent information—for easier data access, aggregation and updates, better data consistency, and simpler application development. The data services layer can access local databases 414, databases of partner organizations 416, applications 418, various customer databases 420 and mainframes 422.

Figure 5:
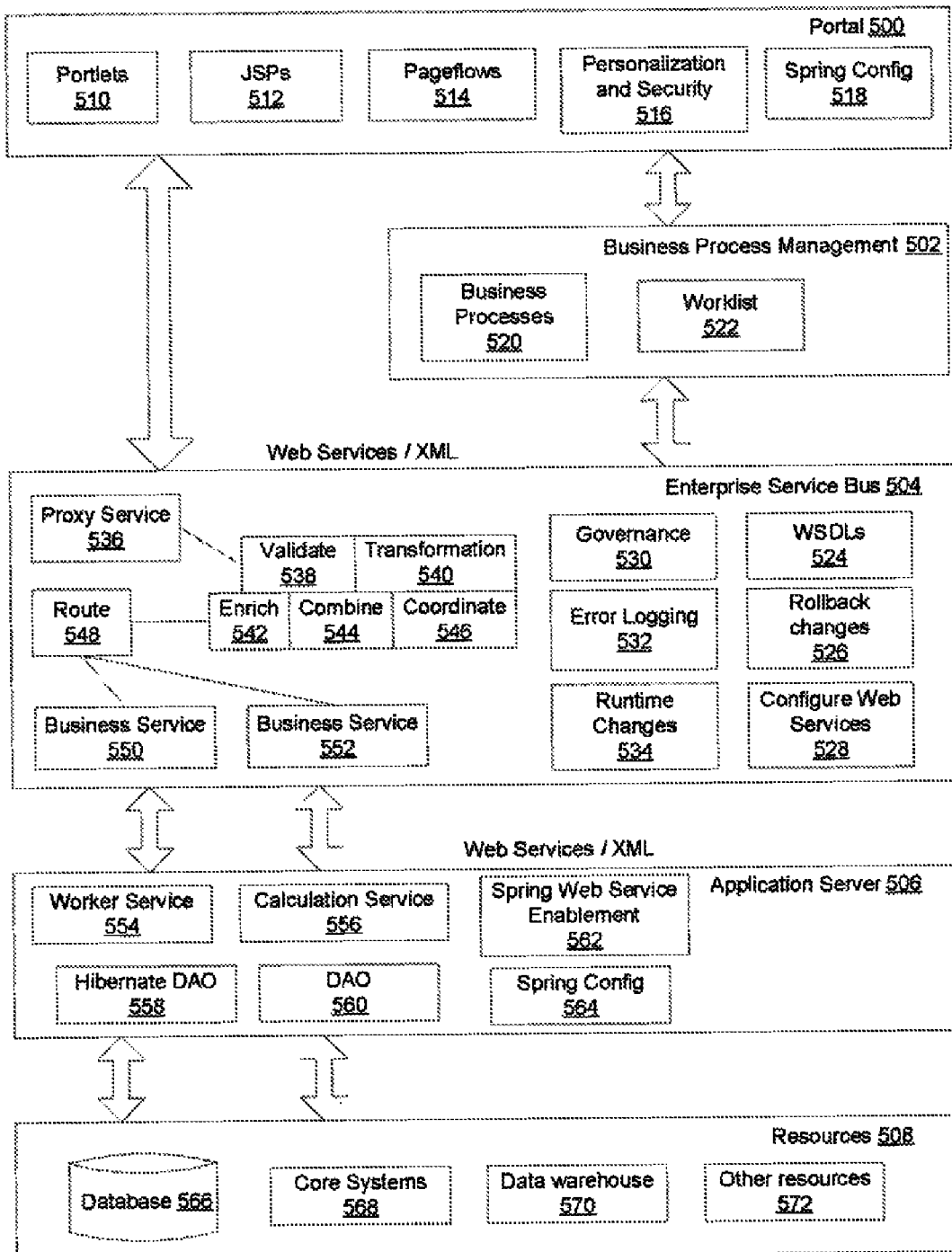
FIG. 5 is an illustration of an alternative view of another exemplary BPM and ESB deployment architecture, in accordance with various embodiments.

FIG. 5 is an illustration of an alternative view of another exemplary BPM and ESB deployment architecture, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Such components, regardless of how they are combined or divided, can execute on the same computing device or can be distributed among different computing devices connected by one or more networks or other suitable communication means. Furthermore, it will also be apparent to one of ordinary skill in the art that certain components can be added, interchanged or removed from this figure without departing from the scope of the various embodiments.

As illustrated, the portal layer 500 can provide various portlets 510, Java Server Pages (JSPs) 512, page flows 514, personalization and security 516 and Spring application framework configuration 518. The BPM system can provide business processes 520 and worklists 522. In one embodiment, a worklist is a central locus of activity for a workflow user that displays lists of tasks for the user and the roles to which the user belongs.

In various embodiments, the portal 500 can maintain connectivity with the BPM system and the enterprise service bus 504. As previously described, the service bus can include a set of proxy services 536 that validate 538, transform 540, enrich 542, combine 544, coordinate 546 or route 548 messages between various business services 550, 552. In one embodiment, the service bus provides governance 530, error logging 532, handling or runtime changes 534, rollback of such changes 526, configuration of web services 528 and WSDLs 524 for the web services published thereon.

In various embodiments, the enterprise service bus 504 can be a layer on top of an application server 506 which provides the specific functionality for some web services (e.g. worker service 554, calculation service 556) and enables the Spring Web Service 562. The application server can connect to the various backend resources 508, such as databases, core systems 568, data warehouses 570 and other similar systems 572. For example, the data access object (DAO) 560 and the hibernate DAO 558 on the application server can provide interfaces between the applications and various data storage devices. Further, the application server can also provide the Spring framework configuration 564. The Spring framework is an open source application framework for Java applications and provides a solution to many technical challenges faced by Java developers and organizations wanting to create applications based on the Java platform. It should be noted that the Spring framework is not intended to limit any aspect of the invention and various alternatives can be used, such as the Enterprise JavaBeans (EJB) framework.

Figure 6:
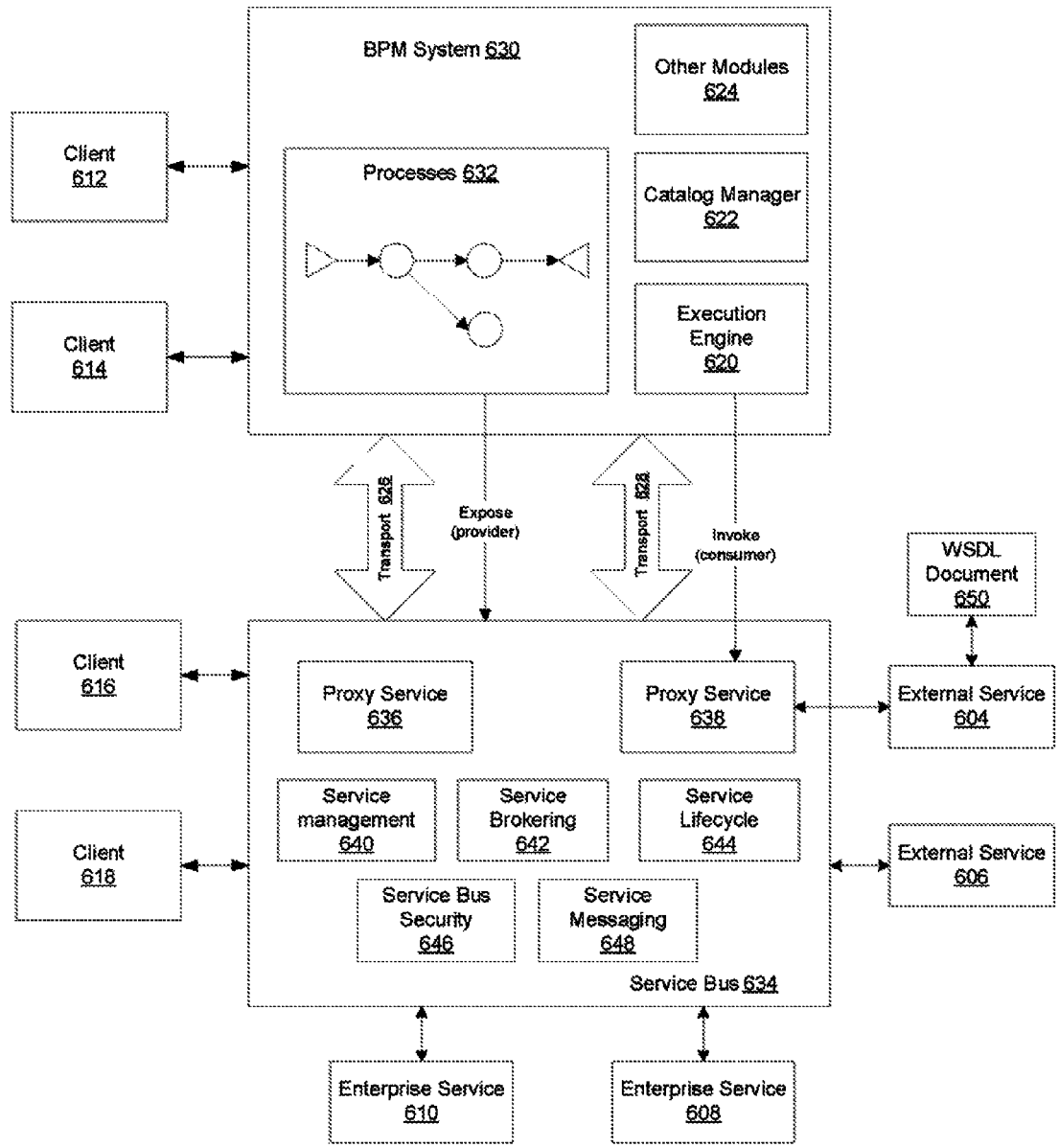
FIG. 6 is an illustration of system level diagram for the integration of the BPM system with a service bus, in accordance with various embodiments.

FIG. 6 is an illustration of system level diagram for the integration of the BPM system with a service bus, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Such components, regardless of how they are combined or divided, can execute on the same computing device or can be distributed among different computing devices connected by one or more networks or other suitable communication means. Furthermore, it will also be apparent to one of ordinary skill in the art that certain components can be added, interchanged or removed from this figure without departing from the scope of the various embodiments.

As illustrated, the system integrates a business process management (BPM) system 630 with an enterprise service bus 634. The BPM system is used to model and define business processes 632. These business processes can be comprised of various activities linked by one or more transitions. Each process can be composed, modeled and defined in a definition file and subsequently deployed (instantiated) in a distributed networking environment, using the BPM system. The BPM system can include an execution engine 620 that executes each process instance, a catalog manager 622 that manages the various components of each process in a catalog and various other modules, as previously described.

In various embodiments, the processes 632 of the BPM system 630 can be providers as well as consumers of web services residing on the enterprise service bus 634. For example, an activity of one or more BPM processes can invoke a proxy service 638 in order to obtain access to an external service 604, thereby effectively acting as a consumer of that web service. Furthermore, once that process is published and deployed, it can be made available as a web service itself on the enterprise service bus, such that other clients 616, 618 and entities of the service bus can gain access to this business process. In this scenario, the BPM would be functioning as a provider of the web service. In one embodiment, each of the processes 632 of the BPM system can be exposed as proxy services 636 on the service bus 634. For example, upon selecting a proxy service of the ESB, a representation of that proxy service can be automatically generated in the catalog of the BPM system, and a new external proxy service resource is automatically created. On the external resource, the user may need to specify a service bus management host configuration. The name of the project and the folders path may exist and if they do not, these should be created by using the Create Structure button or manually by using the service bus configuration console.

A transport 626 can be created to describe each business process as a web service in an optimized manner. This transport can provide the ability to connect the business process management component to the enterprise service bus, such that each of the processes is exposed as a web service residing on the ESB. This can be accomplished by injecting data retrieved from the process definition into the enterprise service bus. In one embodiment, the data injected is associated with the begin activity of the business process and an end activity such that corresponding functions can be invoked as a web service from the ESB.

In various embodiments, several types of transport 626, 628 can be supported by the integration system. For example, hypertext transfer protocol (HTTP) can be used as one type of transport. In another embodiment, a new transport can be created in order to optimally describe the data associated with the business process being injected into the service bus. For example, this transport can define the begin activity and end activity of each business process that is being exposed.

It is preferred that the BPM system be able to authenticate natively with the service bus via Web Services Security (WS-Security). In one embodiment, the BPM system is adapted to be able to understand and exchange WS-Policy elements with the enterprise service bus. If the BPM system and the ESB are installed in the same environment, it is preferred that the BPM system can bypass the WS stack on local calls and invocations. This can significantly improve performance during communication and process execution between the two components. This can also allow for native Java calls between the BPM and the ESB, as well as allow XA (X/Open distributed transaction processing) transactions to be possible.

In various embodiments, two types of interaction can be authenticated. In the case where the BPM system is a consumer, the BPM system introspects Username Token WS-SecurityPolicy assertions attached to the WSDL document that describes the web service. In the case where the BPM system is a provider, the BPM system is configured to support the Username Token profile.

Once the business process is imported into the service bus, the user can be given an option to publish the selected process on the ESB, update processes that are out of date or that are incompatible (with confirmation) or remove the selected processes from the service bus. A web console can be provided that will have buttons providing access to the ESB deployment panel and optionally to access the UDDI registry. One button on the project view can access the ESB panel, and one checkbox can specify enablement of the automatic updates to the service bus. The interconnectivity can allow the BPM system to take advantage of the functionality of the ESB, including but not limited to service management 640, service brokering 642, service lifecycle 644, service bus security 646, service messaging 648, as well as other features.

In various embodiments, the clients 612, 614, 616, 618 of the system include but are not limited to applications, software modules, classes and methods, human users, computing devices and other web services. In one embodiment, the web service is a software component that is capable of being accessed by a client via a network, such as the internet. For example, the service bus can mediate between external services 604, 606 and the various enterprise services 610, 608 that may be provided on an internal application server. In the preferred embodiment, clients of the web services communicate using XML messages via simple object access protocol (SOAP). In this embodiment, the web service can have a WSDL document 650 that describes the service interface along with the details of its bindings to specific protocols in XML format. The WSDL document can also specify the WS-Security policy for that service.

Figure 7:
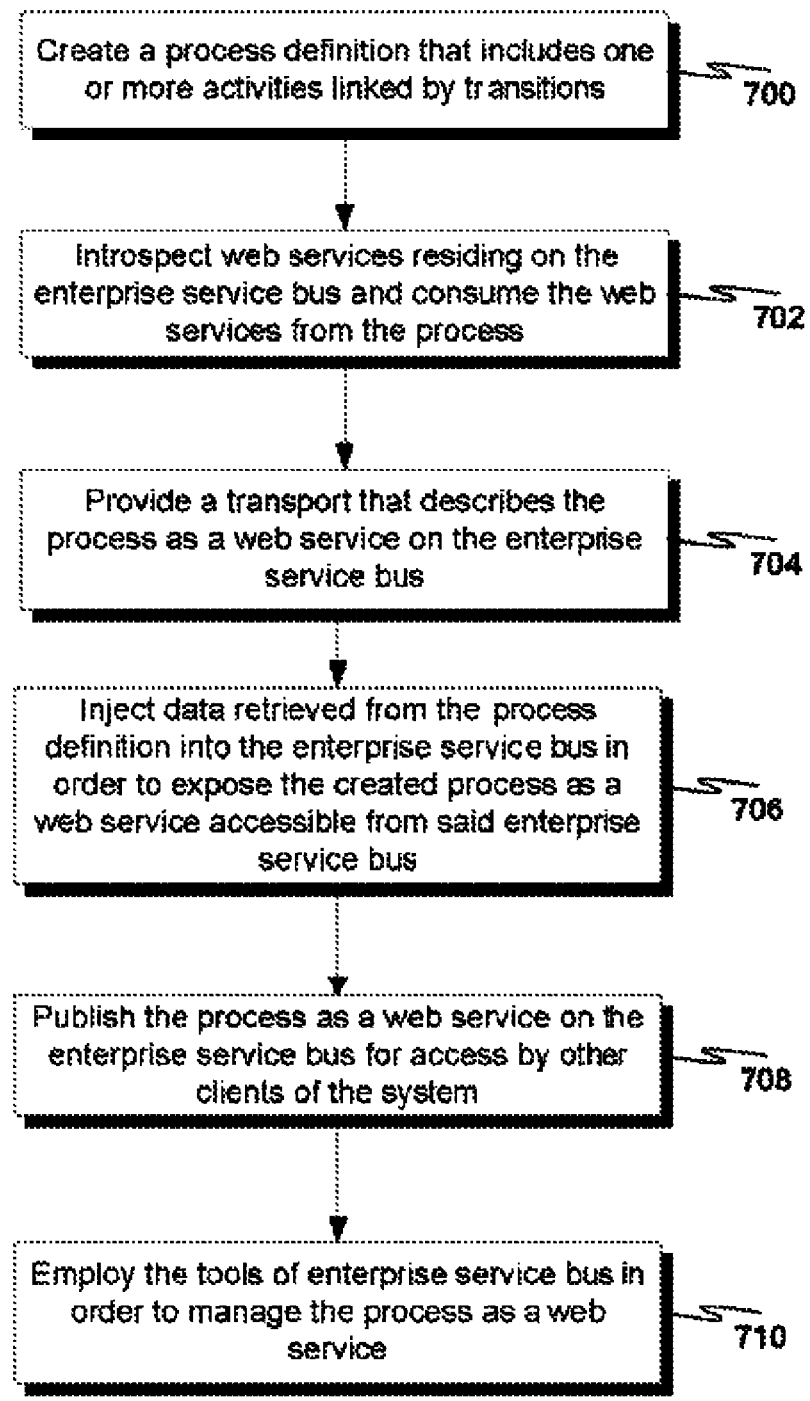
FIG. 7 is an exemplary flow chart diagram of a process in accordance with various embodiments.

FIG. 7 is an exemplary flow chart diagram of a process in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As shown in step 700, a process definition can be created by using the BPM tool, and that definition can include one or more activities linked by transitions. The process can be executed and form a process instance. The process can introspect and consume one or more web services residing on the service bus, as illustrated in step 702.

In step 704, a transport is used to describe the process as a web service to the enterprise service bus. The data retrieved from the process definition can be injected into the enterprise service bus in order to expose the created process as a web service accessible from said enterprise service bus, as shown in step 706. This can allow the process to be published as a web service on the enterprise service bus for access by other clients of the system, as shown in step 708. As such, the various tools and functionality of the service bus can be employed to manage the business process created on the BPM system, in step 710. For example, the advantages provided by such functionality, include but are not limited to (1) an ability to abstract and de-couple service calls from the BPM system, (2) the ability to leverage all of the services provided by the service bus, such as monitoring, reporting, transformations, routing of service calls, service level agreements (SLAs) and (3) an extension of the reach of the BPM system by leveraging all of the communication protocols available with the enterprise service bus.

Various embodiments previously described include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information.

Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored on one or more of the computer readable storage medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments and containers, as well as user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for integrating business processes with web services in a distributed computing environment, said system comprising:

a computer, wherein the computer includes a non-transitory computer readable storage medium;

a business process management component used to model and define one or more business processes stored on the non-transitory computer readable storage medium, wherein each business process includes a set of activities linked by transitions, and wherein each activity represents a step of a particular process, and wherein at least one activity in the set of activities of said particular business process invokes a proxy service to obtain access to an external service;

an enterprise service bus that manages one or more web services and performs routing and transformation of messages between said one or more web services;

an application programming interface that connects said business process management component to the enterprise service bus via a management extension;

a transport that describes each business process as a web service to connect said business process management component to said enterprise service bus, wherein each of said one or more business processes is exposed as a web service on said enterprise service bus, and wherein the external service invoked by the particular business process is available as a web service on the enterprise service bus; and wherein the application programming interface uses one or more managed beans of the management extension to perform operations on each web service.

2. The system of claim 1 wherein the business process management component consumes said one or more web services residing on the enterprise service bus such that said one or more processes invoke said one or more web services of the enterprise service bus.

3. The system of claim 2 wherein at least one activity of a process defined by the business process management component invokes a web service on the enterprise service bus.

4. The system of claim 1, further comprising:
a plurality of heterogeneous clients, one or more of said clients accessing said enterprise service bus in order to invoke said one or more processes deployed on the business process management component as a web service on said enterprise service bus.

5. The system of claim 1, further comprising:
an application programming interface that connects said business process management component to the enterprise service bus via Java Management Extensions (JMX) and uses one or more MBeans of said JMX to perform operations on said enterprise service bus.

6. The system of claim 1 wherein said enterprise service bus further includes:
at least one proxy service that is an intermediary web service hosted locally on the enterprise service bus such that clients exchange messages with the proxy service instead of directly with external web services.

7. The system of claim 6 wherein said business process management component includes
a catalog of compiled software modules usable with other components or programs and wherein:
a representation of said proxy service is generated in the catalog such that said proxy service can be invoked from within the process of the business process management component.

8. The system of claim 1 wherein said business process management component, acting as a consumer, authenticates against the enterprise service bus by introspecting user name token security policy assertions attached to a web services description language (WSDL) document of said web service.

9. The system of claim 1 wherein authentication is provided for said business process management component acting as a provider, by configuring said one or more processes exposed as a web service to support a user name token profile.

10. A method for integrating a business process management system with an enterprise service bus, said method comprising:
generating one or more business processes, wherein each business process includes a set of activities linked by transitions, wherein each activity represents a step of a particular process;
invoking, by an activity of said particular process, a proxy service to obtain access to an external service;
providing an application programming interface that connects said business process management component to the enterprise service bus via a management extension;
generating a transport that describes each business process as a web service on an enterprise service bus, wherein the enterprise service bus manages one or more web services and performs routing and transformation of messages between said one or more web services, and wherein each of said one or more business processes is exposed as a web service on said enterprise service bus;
injecting data retrieved from the external service invoked by the particular business process into the enterprise service bus, and wherein the external service is available as a web service on the enterprise service bus;
publishing said one or more business processes and external service as a web service on the enterprise service bus; and wherein the application programming interface uses one or more managed beans of the management extension to perform operations on each published web service.

11. The method of claim 10 wherein generating the process definition further includes:
introspecting one or more web services residing on the enterprise service bus; and
consuming said one or more web services by invoking the one or more web services of the enterprise service bus from an activity within said process.

12. The method of claim 10 wherein publishing said process as a web service on the enterprise service bus further includes:
exporting one or more objects from the enterprise service bus and using said one or more objects as a customized template;
packaging said one or more objects as a Java archive (JAR) file; and
uploading and importing said JAR file into the enterprise service bus.

13. The method of claim 10, further comprising:
accessing, by one or more clients, said enterprise service bus in order to invoke the process as a web service on said enterprise service bus.

14. The method of claim 10, further comprising:
providing an application programming interface that connects said business process management system to the enterprise service bus via Java Management Extensions (JMX) and uses one or more MBeans of said JMX to perform operations on said enterprise service bus.

15. The method of claim 10 wherein said enterprise service bus further includes:
at least one proxy service that is an intermediary web service hosted locally on the enterprise service bus such that clients exchange messages with the proxy service instead of directly with external web services.

16. The method of claim 15, further comprising:
maintaining a catalog of compiled software modules usable with other components or programs;
and generating a representation of said proxy service in the catalog such that said proxy service is invocable from within the process.

17. The method of claim 10, further comprising:
authenticating the business process management system against the enterprise service bus by introspecting user name token security policy assertions attached to a web services description language (WSDL) document of said web service.

18. The method of claim 10, further comprising:
providing authentication for said business process management system by configuring said one or more processes exposed as a web service to support a user name token profile.

19. A non-transitory computer readable medium carrying one or more sequences of instructions for integrating a business process management system with an enterprise service bus, which instructions, when executed by one or more processors, cause the one or more processors to carry out the steps of:
generating one or more business processes, wherein each business process includes a set of activities linked by transitions, wherein each activity represents a step of a particular process;
invoking, by an activity of said particular process, a proxy service to obtain access to an external service;

providing an application programming interface that connects said business process management component to the enterprise service bus via a management extension;

generating a transport that describes each business process as a web service on an enterprise service bus, wherein the enterprise service bus manages one or more web services and performs routing and transformation of messages between said one or more web services, and wherein each of said one or more business processes is exposed as a web service on said enterprise service bus;

injecting data retrieved from the external service invoked by the particular business process into the enterprise service bus, and wherein the external service is available as a web service on the enterprise service bus;

publishing said one or more business processes and external service as a web service on the enterprise service bus; and wherein the application programming interface uses one or more managed beans of the management extension to perform operations on each published web service.

* * * * *

UNITED STATES PATENT AND TRADEMARK OFFICE
CERTIFICATE OF CORRECTION

PATENT NO.         : 8,185,916 B2                               Page 1 of 1
APPLICATION NO.    : 11/935964
DATED              : May 22, 2012
INVENTOR(S)        : Toussaint et al.

It is certified that error appears in the above-identified patent and that said Letters Patent is hereby corrected as shown below:

In column 1, line 44, delete "whatsover." and insert -- whatsoever. --, therefor.

Signed and Sealed this
Twenty-eighth Day of August, 2012

David J. Kappos
*Director of the United States Patent and Trademark Office*